(12) United States Patent
Strock et al.

(10) Patent No.: US 11,555,419 B2
(45) Date of Patent: Jan. 17, 2023

(54) COST EFFECTIVE MANUFACTURING METHOD FOR GSAC INCORPORATING A STAMPED PREFORM

(71) Applicant: United Technologies Corporation, Farmington, CT (US)

(72) Inventors: Christopher W. Strock, Kennebunk, ME (US); Paul M. Lutjen, Kennebunkport, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 642 days.

(21) Appl. No.: 16/598,552

(22) Filed: Oct. 10, 2019

(65) Prior Publication Data
US 2020/0149431 A1    May 14, 2020

Related U.S. Application Data

(62) Division of application No. 14/715,665, filed on May 19, 2015, now Pat. No. 10,443,444.
(Continued)

(51) Int. Cl.
*F01D 25/24*    (2006.01)
*C23C 28/00*    (2006.01)
(Continued)

(52) U.S. Cl.
CPC ............ *F01D 25/24* (2013.01); *B23K 1/0008* (2013.01); *B23K 1/19* (2013.01); *B23P 15/00* (2013.01); *B23P 15/006* (2013.01); *B23P 15/04* (2013.01); *C23C 28/3215* (2013.01); *C23C 28/3455* (2013.01); *F01D 11/122* (2013.01); *B23K 2103/16* (2018.08); *F05D 2230/90* (2013.01); *F05D 2240/11* (2013.01);
(Continued)

(58) Field of Classification Search
None
See application file for complete search history.

(56) References Cited

U.S. PATENT DOCUMENTS 3,831,258 A    8/1974  Elbert et al.
4,639,388 A    1/1987  Ainsworth et al.
(Continued)

FOREIGN PATENT DOCUMENTS

EP    1491657 A1    12/2004
GB    2272453 A    5/1994

OTHER PUBLICATIONS

European Search Report dated Mar. 18, 2016 issued for European Patent Application No. 15168469.3.

*Primary Examiner* — Daniel J. Schleis
(74) *Attorney, Agent, or Firm* — Bachman & LaPointe, P.C

(57) ABSTRACT

A process for manufacturing a preformed sheet having geometric surface features for a geometrically segmented abradable ceramic thermal barrier coating on a turbine engine component, the process comprising the steps of providing a preformed sheet material. The process includes forming a partially of geometric surface features in the sheet material. The process includes joining the sheet material to a substrate of the turbine engine component. The process includes disposing a thermally insulating topcoat over the geometric surface features and forming segmented portions that are separated by faults extending through the thermally insulating topcoat from the geometric surface features.

7 Claims, 3 Drawing Sheets

Related U.S. Application Data

(60) Provisional application No. 62/001,175, filed on May 21, 2014.

(51) Int. Cl.
| | |
|---|---|
| *F01D 11/12* | (2006.01) |
| *B23P 15/00* | (2006.01) |
| *B23P 15/04* | (2006.01) |
| *B23K 1/00* | (2006.01) |
| *B23K 1/19* | (2006.01) |
| *B23K 103/16* | (2006.01) |

(52) U.S. Cl.
CPC .... *F05D 2250/18* (2013.01); *F05D 2270/114* (2013.01); *F05D 2300/10* (2013.01); *F05D 2300/20* (2013.01); *F05D 2300/502* (2013.01); *F05D 2300/611* (2013.01); *Y02T 50/60* (2013.01)

(56) References Cited

U.S. PATENT DOCUMENTS

| | | |
|---|---|---|
| 5,419,971 A | 5/1995 | Skelly et al. |
| 6,102,656 A | 8/2000 | Nissley et al. |
| 8,357,454 B2 | 1/2013 | Kulkarni et al. |
| 8,506,243 B2 * | 8/2013 | Strock ............ C23C 28/00 415/173.1 |
| 10,711,794 B2 * | 7/2020 | Propheter-Hinckley ........... F01D 5/28 |
| 2004/0163888 A1 | 8/2004 | Johnson |
| 2005/0266163 A1 | 12/2005 | Wortman et al. |
| 2007/0114269 A1 | 5/2007 | Straza |
| 2007/0243408 A1 * | 10/2007 | Straza ............ B32B 3/30 228/177 |
| 2011/0300342 A1 | 12/2011 | Lutjen et al. |
| 2016/0123160 A1 | 5/2016 | Strock et al. |
| 2019/0195080 A1 * | 6/2019 | Paulino ............ C23C 4/10 |

* cited by examiner

COST EFFECTIVE MANUFACTURING METHOD FOR GSAC INCORPORATING A STAMPED PREFORM

CROSS-REFERENCE TO RELATED APPLICATIONS

This application is a divisional of U.S. patent application Ser. No. 14/715,665, filed May 19, 2015 which claims the benefit of provisional application Ser. No. 62/001,175, filed May 21, 2014.

BACKGROUND

The present disclosure is directed to an economical production method for creating the surface geometry associated with geometrically segmented abradable ceramic (GSAC) thermal barrier coating (TBC).

Components that are exposed to high temperatures, such as a component within a gas turbine engine, typically include protective coatings. For example, components such as turbine blades, turbine vanes, blade outer air seals, and compressor components typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provide a minimum clearance between these components such that gas flow around the tips of the blades is reduced to thereby maintain engine efficiency. Over time, internal stresses can develop in the protective coating to make the coating vulnerable to erosion and spalling. The outer air seal may then need to be replaced or refurbished after a period of use.

Increasing emphasis on environmental issues and fuel economy continue to drive turbine temperatures up. The higher engine operating temperatures results in an ever increasing severity of the operating environment inside a gas turbine. The severe operating environment results in more coating and base metal distress and increased maintenance costs. For example, more frequent replacement of the outer air seals.

A coating exists called a geometrically segmented abradable ceramic, (GSAC). The GSAC in development has the potential to satisfy the above described needs in many applications, however the current manufacturing methods are very costly with many added manufacturing steps including metallic layer buildup, diffusion heat treat and CNC milling of the divot structure. There exists a need for a cost effective manufacturing process to produce GSAC.

SUMMARY

In accordance with the present disclosure, there is provided an article comprising a sheet having a first side and a second side opposite the first side. At least one feature is formed in the sheet. The at least one feature comprises at least one rounded edge proximate the first side and at least one sharp corner distal from the rounded edge. The at least one feature protrudes from the sheet second side and is configured to receive a thermally insulating topcoat. The at least one feature is configured to create at least one fault and at least one segmented portion in the topcoat.

In another embodiment, an integral surface layer is coupled to the first side of the sheet. The integral surface layer comprises a transient liquid phase braze material.

In another embodiment, the at least one feature is formed into a pattern of features on the sheet.

In another alternative embodiment, the sheet comprises a MAXMET composite having MAX phases and a metal matrix. The MAX phases are defined by the formula $M_{n+1}AX_n$ where M is an early transition metal element, A is an A-group element, X is C or N, and n=1 to 3.

In another alternative embodiment, a bond coating is coupled to the second side of the sheet. The bond coating can be applied prior to the formation of the features on the sheet.

In another alternative embodiment, A turbine engine component comprising a compressor section. A combustor is fluidly connected with the compressor section. A turbine section is downstream from the combustor. The turbine section has a seal that includes a substrate extending between two circumferential sides, a leading edge, a trailing edge, an inner side for resisting hot engine exhaust gases from the combustor, and an outer side. A preformed sheet is coupled to the outer side. A plurality of geometric surface features are formed in the preformed sheet protruding from the preformed sheet away from the outer side. A thermally insulating topcoat is disposed over the plurality of geometric surface features. The thermally insulating topcoat includes segmented portions that are separated by faults extending through the thermally insulating topcoat from the geometric surface features.

In another alternative embodiment, the preformed sheet comprises a MAXMET composite having MAX phases and a metal matrix. The metal matrix is at least one of a low, medium, and high melting point metal or metal alloy. The MAX phases are defined by the formula $M_{n+1}AX_n$ where M is an early transition metal element, A is an A group element, X is carbon or nitrogen, and n=1 to 3.

In another alternative embodiment, an integral surface layer is coupled between the substrate and the preformed sheet. The integral surface layer comprises transient liquid phase braze material.

In another alternative embodiment, a process for manufacturing a preformed sheet having geometric surface features for a geometrically segmented abradable ceramic thermal barrier coating on a turbine engine component is disclosed. The process comprises the steps of providing a preformed sheet material; forming a plurality of geometric surface features in the sheet material; joining the sheet material to a substrate of the turbine engine component; disposing a thermally insulating topcoat over the geometric surface features; and forming segmented portions that are separated by faults extending through the thermally insulating topcoat from the geometric surface features.

In another alternative embodiment, the process further comprises forming at least one rounded edge feature and at least one sharp edge feature in the geometric surface feature of the preformed sheet material.

In another alternative embodiment, the joining step comprises transient liquid phase brazing of the sheet material to the substrate.

In another alternative embodiment, the process further comprises providing an excess braze reservoir to prevent undesirable corner rounding in the preformed sheet material.

In another alternative embodiment, the process further comprises applying an integral surface layer between the substrate and the preformed sheet material.

In another alternative embodiment, the preformed sheet material comprises a MAXMET composite having MAX phases and a metal matrix. The metal matrix is at least one of a low, medium, and high melting point metal or metal alloy and the MAX phases are defined by the formula $M_{n+1}AX_n$ where M is an early transition metal element, A is an A group element, X is carbon or nitrogen, and n=1 to 3.

The present disclosure provides an economical production method for creating the metallic surface geometry associated with GSAC (geometrically segmented abradable ceramic) TBC coating.

A MAXMET sheet is provided with optional integral surface layer of transient liquid phase braze material. The sheet stock is then punched in a manner similar to forming perforated sheet metal or refractory metal cores for cooled engine parts. The punching process inherently produces a rounded edge on the entry side and sharp corner on the exit side. Sharp corners at both the top and bottom of the GSAC divots are necessary for producing the necessary coating segmentation structure. The rounded corner or other notch or chamfer geometry on the brazed side of the perforated preform act to provide an excess braze reservoir and prevent undesirable corner rounding. Excess braze is always required to prevent areas of lack of bond where mating parts do not perfectly mate. That excess creeps across surfaces and forms fillets in corners due to wetting and capillary action. The capillary action will cause braze material to preferentially fill the narrowest gaps and lowest angle corners first. Taking advantage of this tendency, a corner chamfer, fillet or notch is provided on the braze side of the preform holes. The corner features are sized to accumulate and hold any excess braze that is squeezed out of the tight fitting joint regions. This prevents the rounding of divot bottom corners.

Other details of the turbine article or component and method are set forth in the following detailed description and the accompanying drawing wherein like reference numerals depict like elements.

DETAILED DESCRIPTION

Figure 1:
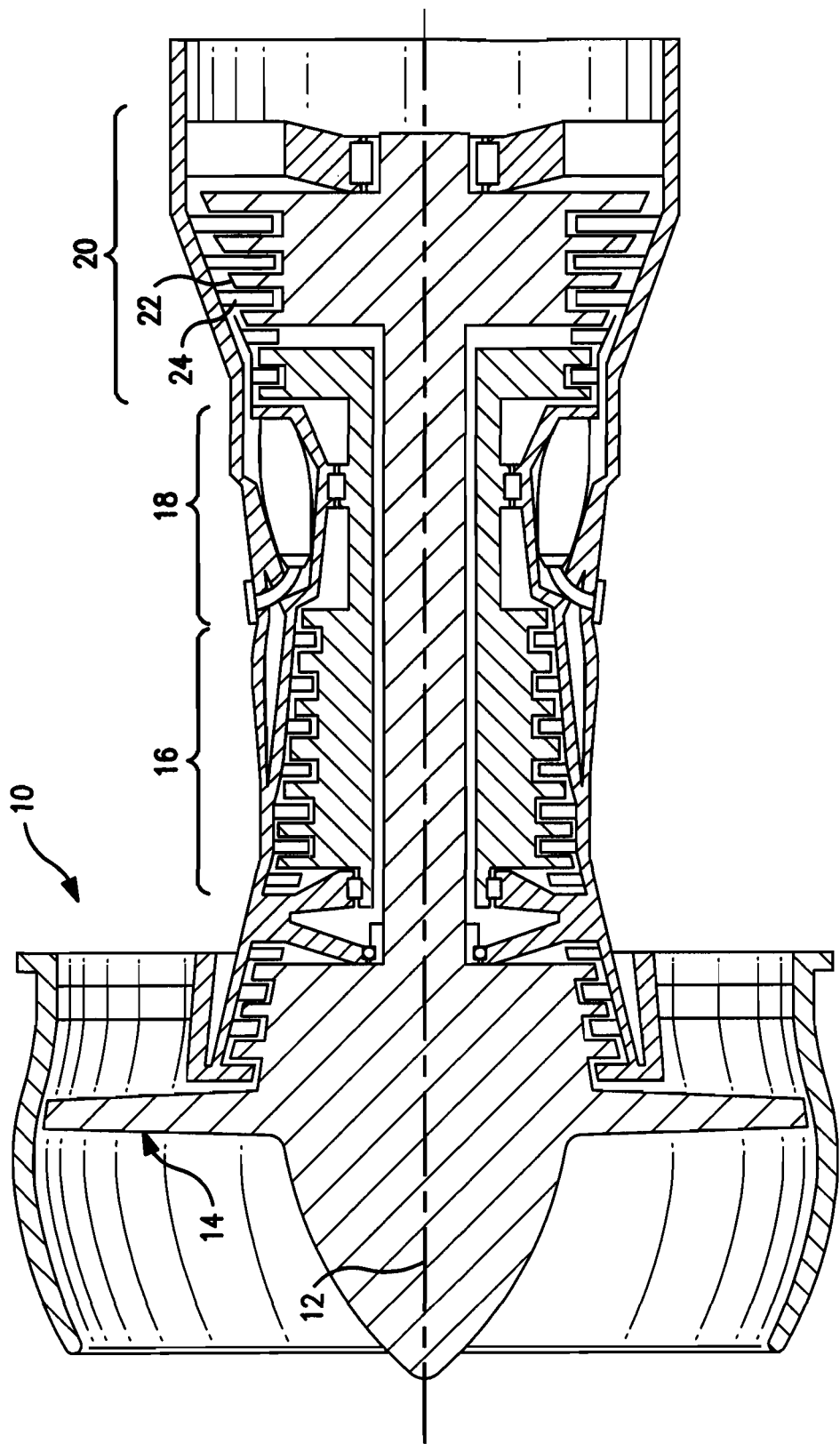
FIG. 1 is a schematic representation of an exemplary turbine engine.

Referring now to the FIG. 1 illustrates selected portions of an exemplary gas turbine engine 10, such as a gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines.

Figure 2:
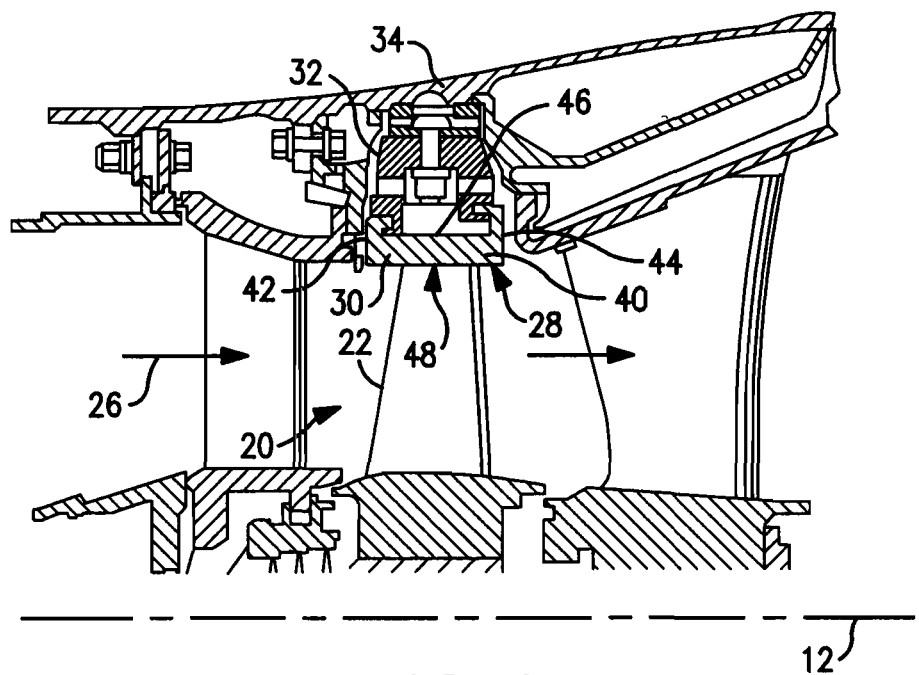
FIG. 2 is a turbine section of the turbine engine.

FIG. 2 illustrates selected portions of the turbine section 20. The turbine blades 22 receive a hot gas flow 26 from the combustion section 18 (FIG. 1). The turbine section 20 includes a blade outer air seal system 28, having a plurality of seal members 30, or gas turbine articles, that function as an outer wall for the hot gas flow 26 through the turbine section 20. Each seal member 30 is secured to a support 32, which is in turn secured to a case 34 that generally surrounds the turbine section 20. For example, a plurality of the seal members 30 may be arranged circumferentially about the turbine section 20. It is to be understood that the seal member 30 is only one example of an article in the gas turbine engine and that there may be other articles within the gas turbine engine that may benefit from the examples disclosed herein.

Figure 3:
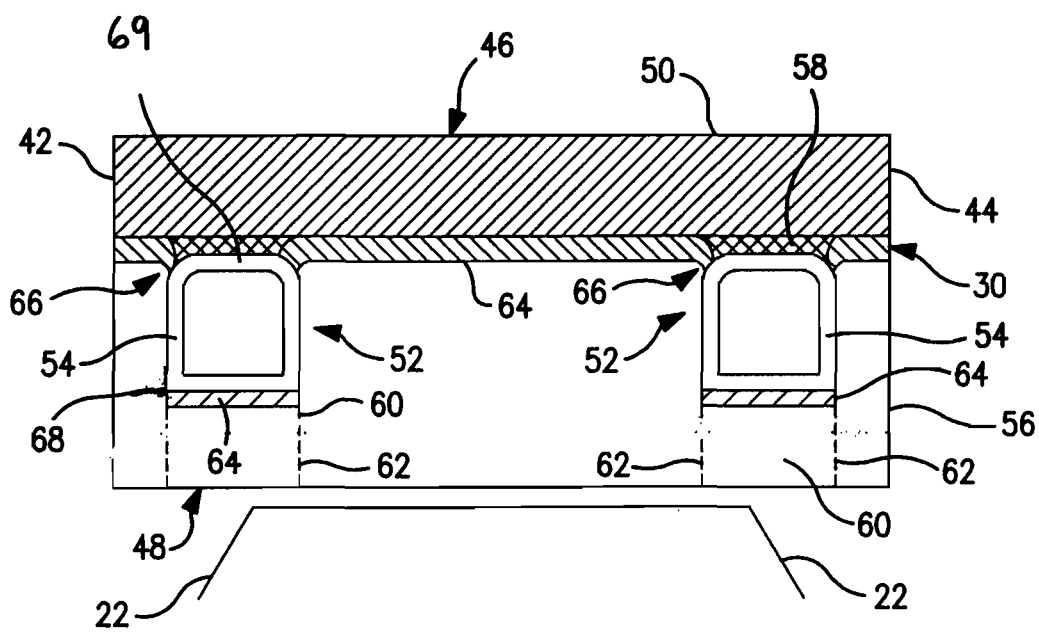
FIG. 3 is an exemplary portion of a turbine article.

FIG. 3. illustrates a portion of seal member 30 having two circumferential sides 40 (one shown), a leading edge 42, a trailing edge 44, a radially outer side 46, and a radially inner side 48 that is adjacent to the hot gas flow path 26. It should be noted that the view in FIG. 3 is a small section of a part cross section. Leading edge 42 and trailing edge 44 do not necessarily have to be leading and trailing edges of the part, but rather the forward and aft edges of the section shown. In an exemplary embodiment, they can represent actual leading and trailing edges. The term "radially" as used in this disclosure relates to the orientation of a particular side with reference to the engine centerline 12 of the gas turbine engine 10.

The seal member 30 includes a substrate 50, a plurality of geometric features or surface geometry 52 (hereinafter "features") that are formed in a preformed sheet 54 (hereinafter "sheet") on the gas path side of the seal member 30, and a thermally insulating topcoat 56 (e.g., a thermal barrier or TBC) disposed over the plurality of features 52 formed in the sheet 54. The features 52 may not be shown to scale. The substrate 50 may include attachment features (not shown) for mounting the seal member 30 within the gas turbine engine 10.

An integral surface layer 58 of transient liquid phase braze material can be applied to the sheet 54 to improve the contact between the substrate 50 and the sheet 54 as well as other advantages to be described herein. In an alternative embodiment, the integral surface layer 58 can comprise an oxidation resistant MCrAlY material. In another alternative embodiment, the integral surface layer 58 can be applied to the sheet 54 opposite the substrate 50.

The thermally insulating topcoat 54 includes segmented portions 60 that are separated by faults 62 extending through the thickness of the thermally insulating topcoat 56 from the features 52. The faults 62 extend from the edges or sides of the features 52 and facilitate reducing internal stresses within the thermally insulating topcoat 56 that may occur from sintering of the topcoat material at relatively high temperatures within the turbine section 20 during use in the gas turbine engine 10. Depending on the composition of the topcoat 56, surface temperatures of about 2500 degrees Fahrenheit (1370 degrees C.) and higher may cause sintering. The sintering may result in densification and diffusional shrinkage of the thermally insulating topcoat 56 and thereby induce internal stresses. In conventional non-segmented coatings the internal stresses due to sintering shrinkage may be high enough to cause spallation of the coating. In GSAC coating, the faults 62 provide pre-existing locations for accommodating the strain associated with sintering, reducing the internal stresses (e.g., reducing shear and radial stresses). That is, the energy associated with the internal stresses is maintained at a lower level due to the faults 62 such that there is less energy available for causing delamination cracking between the thermally insulating topcoat 56 and the underlying sheet 54, substrate 50 or a bond coat 64 and spallation. The faults 62 facilitate reduction of internal stress energy within the thermally insulating topcoat 56.

The faults 62 may be produced by using any of a variety of different geometric surface features formed in the sheet 54. The pattern and shape of the features 52 is not limited to any particular pattern and may be a grid type of pattern with individual perforations that extend from one surface of the sheet to the other surface of the sheet 54. For example, a hexagonal close packed pattern of perforations may be formed in a sheet. The perforations being 0.080 inches in diameter and spaced on center at 0.105 inch spacing.

The preformed sheet 54 may comprise a metallic or MAXMET sheet of material. Desirable metallic compositions for the sheet material include nickel based superalloy such as PWA1484, oxidation resistant MCrAlY compositions such as PWA1386. The sheet 54 material may be a MAXMET composite which is a MAX-based metal matrix composite. The composite can contain a MAX phase ternary carbide and a metal matrix. MAX phases which are defined by the formula $M_{n+1}AX_n$ where n is a number from 1 to 3. M is an early transition metal element, A is an A group element, and X is carbon (C) or nitrogen (N). Early transition metals are any element in the d-block of the periodic table, which includes groups 3 to 12 on the periodic table. A-group elements are mostly group IIA or IVA. The metal matrix is at least one of a low, medium, and high melting point metal or metal alloy. Low melting point metals or metal alloys are those approximately in the range of from 100 degrees Centigrade to 300 degrees Centigrade. Medium melting point metals or metal alloys are those approximately in the range of 300 degrees Centigrade to 1000 degrees Centigrade. High melting point metals or metal alloys are those in the range of 1000 degrees Centigrade and greater. The MAX phases are layered hexagonal solids, in which near close-packed layers of early transition metals are interleaved with layers of pure A-group elements, or C or N atoms filling the octahedral sites between the transition metal layers. MAX Phases are machinable, damage tolerant, stiff and lightweight. The MAX Phases are nanolaminates, assemblages of microscopic layers analogous to many layered solids. MAXMET materials are characterized by excellent mechanical properties with improved toughness, high damage tolerance, high thermal stability, thermal conductivity, damping, high elastic stiffness, fatigue, thermal shock, creep resistance and improved erosion resistance. Some MAX Phases exhibit good bonding with metals, low friction coefficient and good fretting wear resistance.

The features 52 may be formed in the sheet 54 by a variety of means. The features 52 can be formed as a deep recess, divot or notch on the surface of the sheet 54. The sheet 54 stock can be punched to create an indent in a manner similar to forming perforated sheet metal or refractory metal cores for cooled engine parts.

The feature 52 forming process (e.g., punching process) inherently produces a rounded edge 66 on the entry side and sharp corner 68 on the exit side. Both these geometries are desirable. Sharp corners at both the top and bottom of the GSAC divots are necessary for producing the necessary coating segmentation structure 60, 62. The rounded corner 66 or other notch or chamfer geometry on the integral surface side 58 (i.e., brazed side) of the perforated preform sheet 54 act to provide an excess braze reservoir and prevent undesirable corner rounding. Excess braze can be required to prevent areas that lack a sufficient bond where mating parts do not perfectly mate. That excess material can creep across surfaces and form fillets in corners due to wetting, surface tension and resultant capillary action. That same capillary action will cause braze material to preferentially fill the narrowest gaps and lowest angle corners first. Taking advantage of this tendency, a corner chamfer, fillet or notch is provided on the integral surface layer 58 side (braze side) of the features 52 (i.e., preform holes). The corner features 52 are sized to accumulate and hold any excess braze that is squeezed out of the tight fitting joint regions when the sheet 54 is coupled with the substrate 50. Removing excess braze from the tight fitting joints prevents the rounding of divot bottom corners.

The geometric surface features 52 may be selected to be any of a variety of different patterns or shapes. As an example, the features 52 may be formed as hexagonal walls that define a cell structure therebetween. Alternatively, the walls may be other shapes and need not be continuous.

The material selected for the substrate 50, bond coat 64 (if used), and thermally insulating topcoat 56 are not necessarily limited to any particular kind. For application on the seal member 30, the substrate 50 may be a metal alloy, such as a nickel based alloy. The bond coat may include any suitable type of bonding material for attaching the thermally insulating topcoat 56 to the preformed sheet 54.

The bond coat 64 may include any suitable type of bonding material for attaching the thermally insulating topcoat 56 to the sheet 54. In some embodiments, the bond coat 64 includes a nickel alloy, platinum, gold, silver, or MCrAlY where the M includes at least one of nickel, cobalt, iron, or combination thereof, Cr is chromium, Al is aluminum and Y is yttrium. The bond coat 64 may be approximately 0.005 inches thick (approximately 0.127 millimeters), but may be thicker or thinner depending, for example, on the type of material selected and requirements of a particular application.

The thermally insulating topcoat 56 may be any type of ceramic material suited for providing a desired heat resistance in the gas turbine article. As an example, the thermally insulating topcoat 56 may be an abradable coating, such as yttria stabilized with zirconia, hafnia, and/or gadolinia, gadolinia zirconate, molybdate, alumina, or combinations thereof. The topcoats 56 may also include porosity. While various porosities may be selected, typical porosities in a seal application include 5 to 70% by volume.

Figure 4:
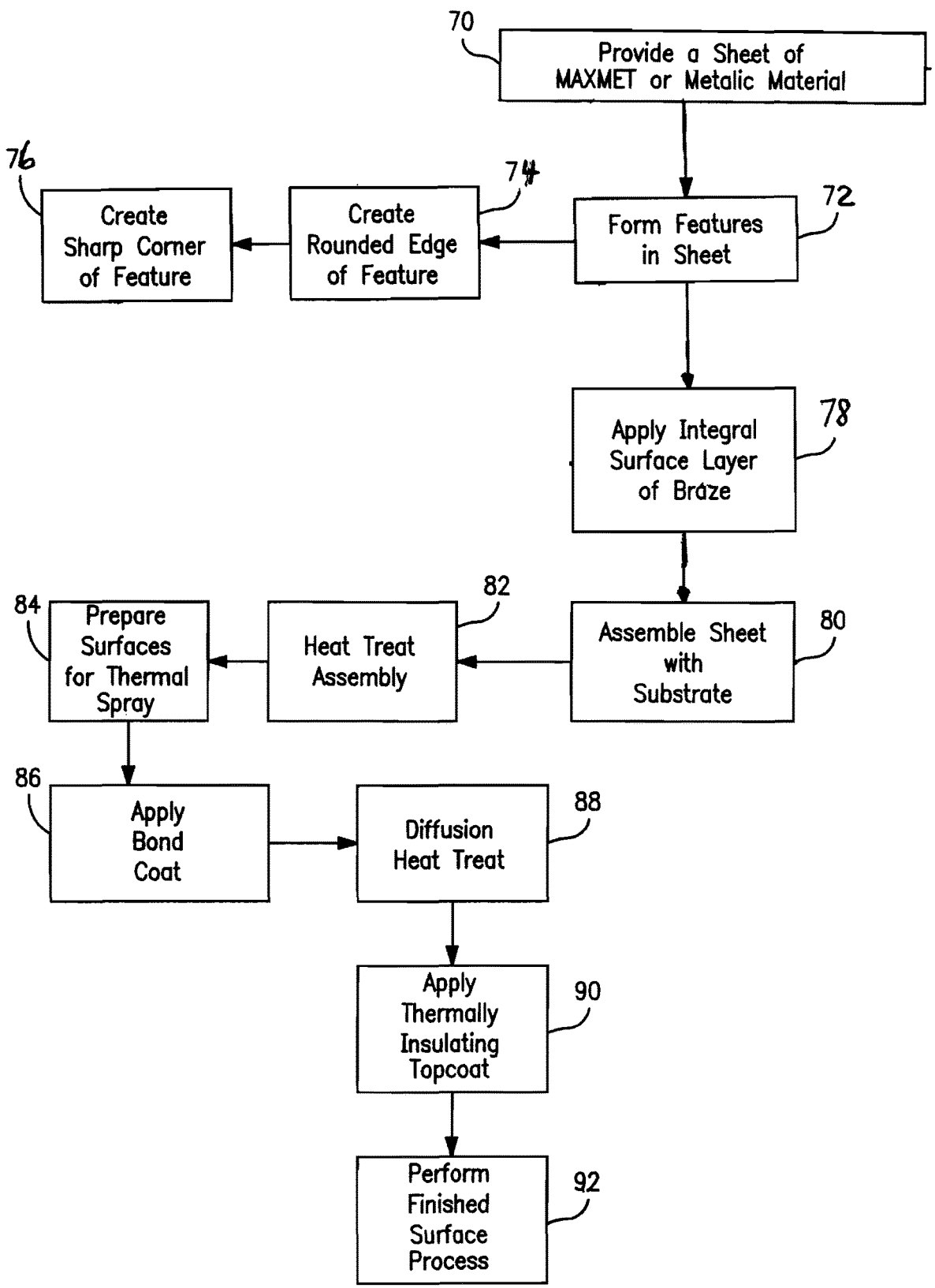
FIG. 4 is the process steps map of the inventive method of manufacture.

FIG. 4 illustrates a method diagram of the inventive process used to form the preformed sheet 54. At step 70 a sheet of material is provided. The preformed sheet 54 may be made of MAXMET sheet material. In an alternative embodiment, the sheet may be a metallic material. The step 72 includes forming at least one feature 52 in the sheet 54. The details of forming the feature 52 have been described above. Step 74 includes creating the rounded edge 66 of the feature 52 in the sheet 54. The rounded edge 66 is proximate to the first side 69 of the sheet 54. The next step 76 includes creating the sharp corner 68 of the feature 52. At step 78 the integral surface layer 58 is applied to the sheet 54 on a first side 69 (braze side) of the sheet 54 which will be coupled to the substrate 50. The integral surface layer 58 may comprise a transient liquid phase braze material or other braze material. The next step 80 includes assembling the sheet 54 with the substrate 50. In an exemplary embodiment a holding fixture can be utilized. At step 82 a heat treatment is applied to the assembly. The surfaces of the assembly are prepared for thermal spray at step 84. In an exemplary embodiment the surfaces are grit blast. The bond coat is applied at step 86. In an alternative embodiment, the bond coat can be applied to the sheet prior to forming the features. The bond coat and assembly is then diffusion heat treated at step 88. After the diffusion heat treat 88, the thermally insulating top coat is applied at step 90. If desired the surfaces can have a surface finish process applied, such as grinding, at step 92.

The preformed sheet 54 may be applied to the substrate 50, such that the necessary features 52 are available for the proper formation of the segmented portions 60 and faults 62 of the topcoat 56 for the geometrically segmented abradable ceramic (GSAC) thermal barrier coating (TBC).

There has been provided a method of producing an economical preform sheet for gas turbine engine components. The method provides for an economical manufacturing process for GSAC part geometry. The perforated preform can be mass produced, cut to size and diffusion bonded (brazed) to simply formed substrates (BOAS). The stamped preform is made more feasible through use of the excess braze reservoir feature that prevents braze from rounding the divot bottom corners. This method would be very applicable to use on large and simple geometry industrial gas turbine parts as well as aero gas turbine parts. While the method has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for manufacturing a preformed sheet having geometric surface features for a geometrically segmented abradable coating on a turbine engine component, said process comprising the steps of:
   providing a preformed sheet material;
   forming a plurality of geometric surface features in said sheet material, said plurality of geometric surface features comprising at least one perforation feature punched in said sheet material, the at least one perforation feature comprising at least one rounded edge proximate a first side and at least one sharp corner distal from said rounded edge;
   joining said sheet material to a substrate of said turbine engine component;
   disposing a thermally insulating topcoat over said geometric surface features; and
   forming segmented portions that are separated by faults extending through the thermally insulating topcoat from the geometric surface features.

2. The process of claim 1, wherein said joining step comprises transient liquid phase brazing of said sheet material to said substrate.

3. The process of claim 1, further comprising providing an excess braze reservoir to prevent undesirable corner rounding in said preformed sheet material.

4. The process of claim 1, further comprising, applying an integral surface layer between said substrate and said preformed sheet material.

5. The process of claim 1, wherein said preformed sheet material comprises a MAXMET composite having MAX phases and a metal matrix.

6. The process of claim 5, wherein said metal matrix is at least one of a low, medium, and high melting point metal or metal alloy and said MAX phases are defined by the formula $M_{n+1}AX_n$ where M is a transition metal element, A is an A group element, X is carbon or nitrogen, and n=1 to 3.

7. The article according to claim 1, wherein said at least one perforation feature is formed into a pattern of perforation features on said sheet material.

* * * * *